(No Model.)
B. F. SMITH.
DRILL STOCK.
No. 444,256. Patented Jan. 6, 1891.
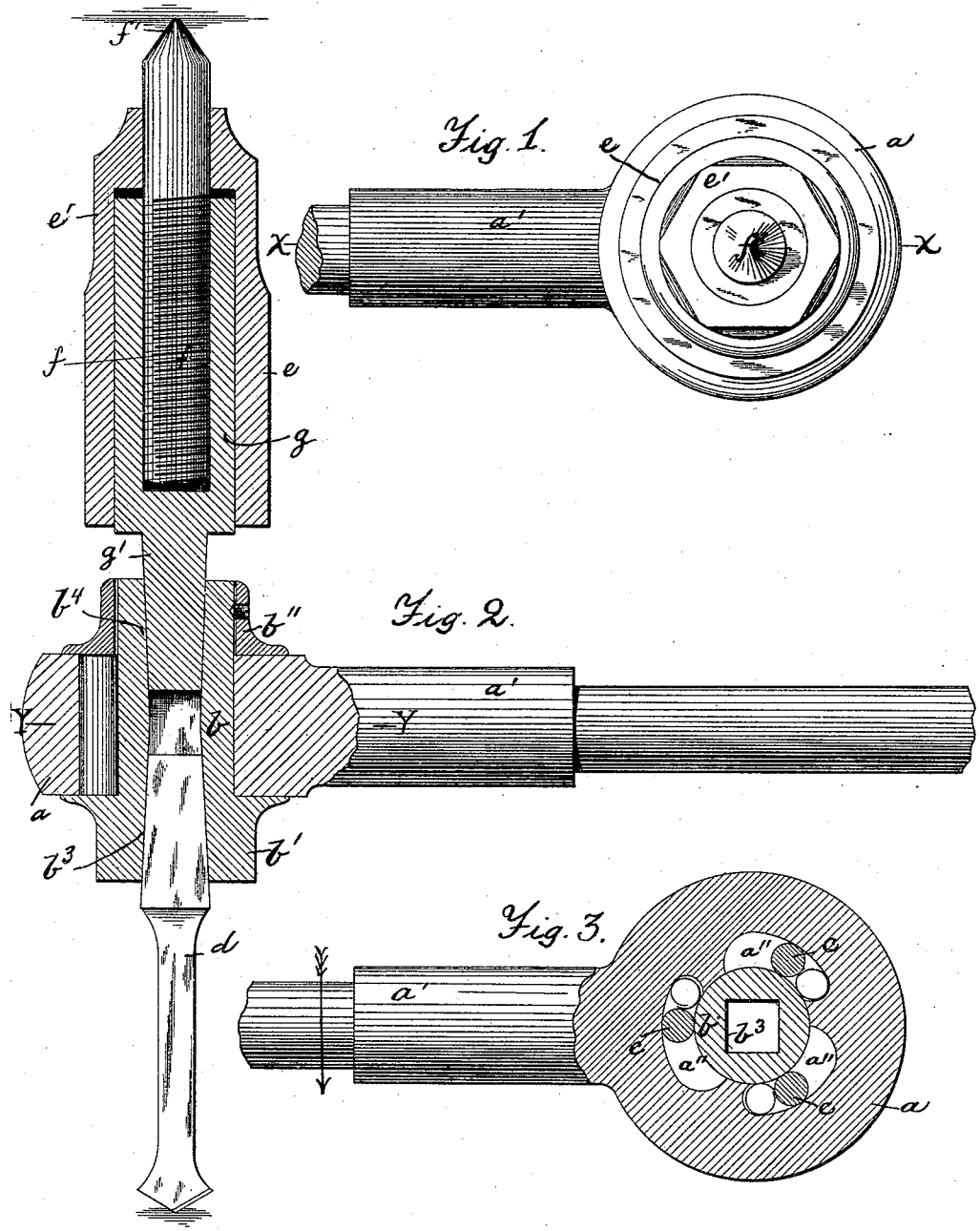
Witnesses.
Irving H. Gay.
Chas. S. Barker.
Inventor.
Benjamin F. Smith.
by Alban Andrén, his atty.

UNITED STATES PATENT OFFICE.

BENJAMIN F. SMITH, OF SOMERVILLE, MASSACHUSETTS.

DRILL-STOCK.

SPECIFICATION forming part of Letters Patent No. 444,256, dated January 6, 1891.

Application filed September 22, 1890. Serial No. 365,713. (No model.)

*To all whom it may concern:*

Be it known that I, BENJAMIN F. SMITH, a citizen of the United States, and a resident of Somerville, in the county of Middlesex and State of Massachusetts, have invented new and useful Improvements in Drill-Stocks, of which the following, taken in connection with the accompanying drawings, is a specification.

This invention relates to improvements in drill-stocks; and it consists in the combination, with a drill-stock, of a detachable and reversible feed-screw device by which the usefulness of the tool is materially increased, as will hereinafter be more fully shown and described, reference being had to the accompanying drawings, wherein—

Figure 1 represents a plan view of the invention. Fig. 2 represents a central longitudinal section on the line X X shown in Fig. 1, and Fig. 3 represents a cross-section on the line Y Y shown in Fig. 2.

Similar letters refer to similar parts wherever they occur on the different parts of the drawings.

$a$ is the hub of the drill-stock, having a handle $a'$, as usual. The stock $a$ has a central vertical perforation, in which is loosely journaled the sleeve $b$, having in one end a shoulder $b'$, and having attached to its opposite end a collar $b''$, as fully shown in Fig. 2.

In the drawings I have shown the stock $a$ as having tapering recesses $a''\,a''\,a''$, in which are loosely arranged the friction-rollers $c\,c\,c$, in a manner and for the purpose as fully shown and described in the patent granted to me October 23, 1888, No. 391,655, for improvements in tap and drill stocks, by which arrangement the sleeve $b$ is caused to follow the motion of the handle $a'$ when the latter is swung in the direction shown by arrow in Fig. 3. When the said handle is swung in an opposite direction, no motion is imparted to said sleeve $b$. This is what is termed a "friction drill-stock," and this is the kind I have represented in the drawings; but I wish to state that, although I have shown such a friction drill-stock in the drawings, I do not wish to limit my improved feed device to the combination with such precise drill-stock, as it is equally applicable to what is termed "ratchet drill-stocks;" and I wish to state that the particular drill-stock as shown forms no part of my present invention, as it may be varied, and any of the well-known drill-stocks may be used without departing from the essence of my invention.

The sleeve $b$ has in each of its ends tapering recesses $b^3$ and $b^4$, either of which is adapted to receive the shank of the drill $d$ or other tool—such as, for instance, bits, screw-drivers, nuts, and the like—or the shank of the screw-feeding device. The improved feeding device consists of a sleeve $e$, within which is secured in a suitable manner the feed-screw $f$, the upper end of which projects through the upper end of the said sleeve and terminates as a center point $f'$, as shown in Fig. 2. Within the sleeve $e$ is fitted loosely the socket $g$, which is centrally screw-threaded to receive the feed-screw $f$, said socket having at its lower end a shank $g'$ adapted to fit into either of the tapering recesses $b^4$ or $b^3$ of the drill-stock sleeve $b$, as shown in Fig. 2.

The sleeve $e$ has preferably at its upper end a polygonal head $e'$, which may be grasped, turned, or held by the aid of a suitable wrench or other device during the operation of the tool.

Heretofore in drill-stocks the socket of the feed-screw device has been permanently attached to the drill-stock sleeve, by which the utility of the drill-stock is very much limited, as it could only be used for the purpose of imparting motion in one direction to its drill, tap, or other tool; but by making the feed-screw device as a detachable structure from the drill-stock the position of said feed-screw device may be reversed so as to impart motion in any one of two opposite directions to the drill-stock sleeve and the tool inserted therein, and by such arrangement the usefulness of the drill-stock is materially increased.

Having thus fully described the nature, construction, and operation of my invention, I wish to secure by Letters Patent, and claim—

In combination with a drill-stock, a detachable feed-screw device consisting of a sleeve $e$ and a longitudinal screw $f$ secured within it, and an internally-screw-threaded socket $g$, adapted to receive the said screw and fitting within said sleeve, and having a shank $g'$ adapted to be inserted in either end of the socketed drill-stock sleeve, substantially as and for the purpose set forth.

In testimony whereof I have signed my name to this specification, in the presence of two subscribing witnesses, on this 16th day of September, A. D. 1890.

BENJAMIN F. SMITH.

Witnesses:
ALBAN ANDRÉN,
ALICE A. PERKINS.